United States Patent [19]

Rink

[11] Patent Number: 5,778,259
[45] Date of Patent: Jul. 7, 1998

[54] UNDERWATER VIDEO CAMERA HOUSING

[76] Inventor: Philip A. Rink, 934 Glenhaven Dr., Everett, Wash. 98203

[21] Appl. No.: 848,344

[22] Filed: Apr. 30, 1997

Related U.S. Application Data

[63] Continuation of Ser. No. 587,593, Jan. 17, 1996, abandoned.

[51] Int. Cl.[6] .......................... B65D 85/38; G03B 17/08; H04N 5/225
[52] U.S. Cl. .......................... 396/27; 206/316.2; 348/81; 348/373; 348/376
[58] Field of Search .................. 396/25, 27, 29; 206/316.1, 316.2; 348/61, 81, 373, 376

[56] References Cited

U.S. PATENT DOCUMENTS

| | | | |
|---|---|---|---|
| 1,122,104 | 12/1914 | Gruen | 354/64 |
| 2,987,893 | 6/1961 | Robinson, Jr. | 354/64 X |
| 4,281,343 | 7/1981 | Monteiro | 348/81 |
| 4,485,398 | 11/1984 | Chapin, Jr. et al. | 348/81 |
| 4,982,841 | 1/1991 | Goedecke | 206/316.2 |
| 5,350,147 | 9/1994 | Paganus | 354/293 X |

*Primary Examiner*—Safet Metjahic
*Assistant Examiner*—J. K. Han
*Attorney, Agent, or Firm*—Jensen & Puntigam, P.S.

[57] ABSTRACT

The assembly includes a molded body portion and a metal liner and has an interior portion which is adapted to receive a video camera. A transparent plate is positioned in front of the video camera, with the edges thereof received in an interior surface groove in the molded body. A clamp around the exterior portion of the body outboard of the interior surface groove provides sufficient pressure to maintain a watertight seal for the assembly. A video/power cable extends from the submerged assembly to a monitor which is located at the surface of the water, such as on a boat or raft.

6 Claims, 2 Drawing Sheets ns,259

UNDERWATER VIDEO CAMERA HOUSING

This is a continuation of application Ser. No. 08/587,593, filed on Jan. 17, 1996, now abandoned.

TECHNICAL FIELD

This invention relates generally to underwater video cameras and more particularly to a housing assembly for such a camera.

BACKGROUND OF THE INVENTION

Underwater video cameras are in general well known. They are used with a topside monitor and a connecting video/power cable for such diverse purposes as to inspect the condition of submerged structures such as docks, pilings and the like, to view underwater landscape in general, to inspect a potential diving site, or to view fish and other marine life. However, currently available underwater video camera assemblies are expensive, and typically are rather bulky and usually cumbersome to use. Accordingly, underwater camera systems, including a remote monitor, while generally known, are not yet widely used, particularly for general enjoyment and or family use.

DISCLOSURE OF THE INVENTION

Accordingly, the present invention is an assembly for housing an underwater video camera, comprising: a plastic housing body which is slightly deformable under pressure, including a cavity therein adapted for receiving a video camera; an interior metal liner for a portion of the housing body, providing sufficient weight and rigidity for the assembly that the assembly readily sinks in water and does not collapse from water pressure; and a transparent element positioned in a watertight relationship with the housing body at a front open end of the housing body, in front of the video camera.

BEST MODE FOR CARRYING OUT THE INVENTION

Figure 1:
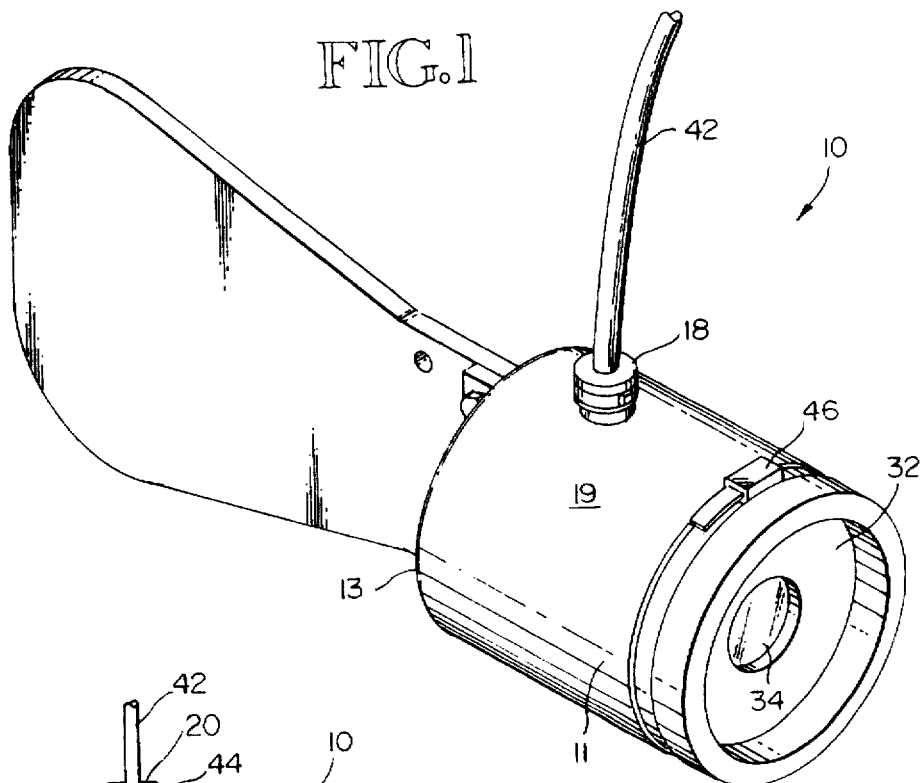
FIG. 1 is an isometric view of the underwater video camera assembly of the present invention.
Figure 2:
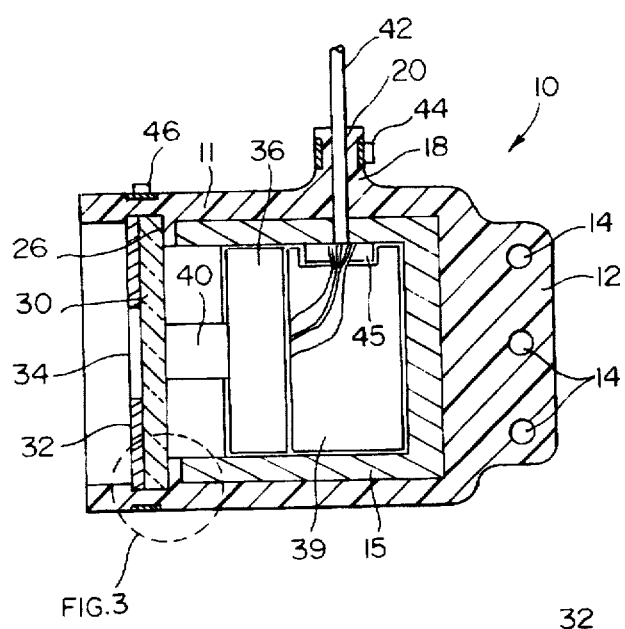
FIG. 2 is a longitudinal cross-section of the assembly of FIG. 1, without the fin portion.

FIGS. 1 and 2 are isometric and cross-sectional views, respectively, of the underwater video camera housing assembly 10 of the present invention. The assembly includes a molded portion 11 which is basically cylindrical in configuration, having an external diameter of approximately 3½ inches and a length of approximately 4¼ inches. In the embodiment shown, the molded portion is polyurethane. Other similar materials could be used, as long as they deform to a small extent, i.e. slightly, under pressure.

At the rear end of housing 10 is a tab portion 12 which is an integral part of the molded portion 11 of the housing. The tab portion 12 is approximately 2⅝ inches long, approximately ⅞-inch high and ⅛-inch thick and extends rearwardly of the housing perpendicularly to the rear end 13 thereof and approximately on a diameter line. Tab portion 12 has three openings 14—14 therethrough, positioned at spaced intervals along the length thereof.

The housing 10 also includes an inner steel cup portion 15 which has an exterior diameter of approximately 3 inches and is approximately 3 inches in length. The thickness of the steel cup is approximately ¼ inch, with the base of the cup being slightly thicker. The polyurethane molded portion of the housing is molded around the steel cup so that the steel cup and the polyurethane are in effect bonded together.

The housing 10 also includes a cable mounting spline or element 18 which is an integral part of the molded portion of the housing and extends perpendicularly to the cylindrical surface 19 of the housing. Mounting spline 18 is located at the center of gravity for the assembly when it is submerged, so that the assembly tends to remain horizontal when it is underwater. In the embodiment shown, mounting spline 18 is approximately one-half inch in diameter, approximately one-half inch high, and has an opening 20 which extends therethrough. Opening 20 continues through the remainder of the housing, including the inner steel cup, thereby providing access to the interior of the housing. The mounting spline 18 includes a shallow relieved portion, approximately 5/16 inches wide, around its periphery to accommodate and hold a clamp, which will be described in more detail in the following paragraphs.

The molded portion 11 of the housing 10 has the same internal diameter as that of the steel cup 15 for a distance of approximately one-quarter inch beyond the front edge of the steel cup, at which point the internal diameter of the molded portion increases to approximately 3 inches for a distance of approximately ⅜ inch. The internal diameter then decreases slightly, remaining the same until the front edge 26 of molded portion 11.

The inner surface of the molded portion forward of the steel cup thus has a shallow groove or recess for a small distance (⅜ inch). Around the exterior periphery of the molded portion, directly outboard of the inner surface groove, is a shallow relieved portion or groove, approximately 5/16-inch wide, which accommodates a peripheral clamp, which is also discussed in more detail below.

The inner groove accommodates a circular glass plate element 30, approximately ¼-inch thick and an adjacent protective cover element 32 which is plastic in the embodiment shown and includes a central opening 34 approximately ¾ inch in diameter. The glass plate could be made from other hard, clear materials, such as Lexan or Plexiglass. The glass element 30 forms a pressure wall or barrier for the front end of the housing, while protective cover element 32 provides protection for the glass element from impact damage.

A conventional video camera 36 is positioned in the interior of the housing defined by the steel cup 15. The video camera may be any one of a number of commercially available cameras from various manufacturers, such as Marshall Electronics. Camera 36 is protected by foam packing material 39 which is positioned around the camera in the interior of the mounting assembly. The lens 40 of the camera is positioned so that it is in registry with opening 34 in the protective cover element 32.

A video/power cable 42 extends from video camera 36 and through opening 20 in the housing, including mounting spline 18. This video/power cable 42 can be of various lengths, depending on the application, although a 100–150 foot length would be typical. The video/power cable 42 is secured to the housing 10 in two ways, to prevent the wires in the cable which carry the video and power signals from themselves alone bearing the weight of the assembly, which would lead to breakage of the wires.

A stainless steel clamp 44 is used to clamp the mounting spline 18 about the cable 42. Since polyurethane is slightly deformable, pressure exerted by the clamp about the mounting spline will force the inner surface of the mounting spline tight against and about the video cable 42. The contact is sufficient to provide a watertight seal between the cable and the housing, eliminating the need for separate sealing elements or surfaces.

The cable 42, as indicated above, extends down through an opening 20 in the steel cup 15. In this portion of the cable, an aramid fiber braid portion 43, or other portion having good strength, of the cable is exposed by removing a portion of the sheath, wrapping the braid around a separate dowel pin 45, and then securing the end with a durable adhesive such as Superglue. Dowel pin 45 abuts the inner surface of steel cup 15, with the video and power wires extending down into the interior for connection to the camera. This arrangement takes the tension off the wires themselves, since the dowel pin against the cup surface bears the weight of the assembly.

Figure 3:
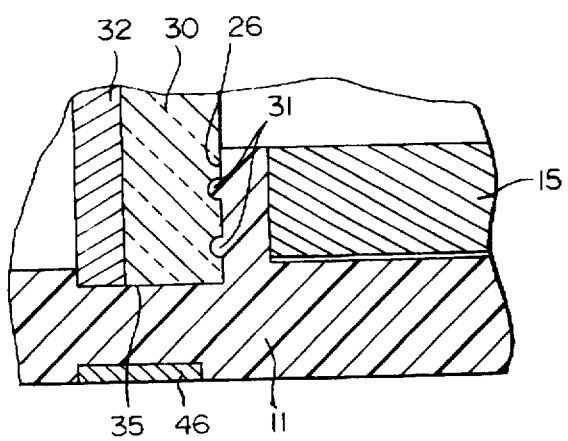
FIG. 3 is a cross-sectional diagram showing in more detail a portion of FIG. 2.
Figure 4:
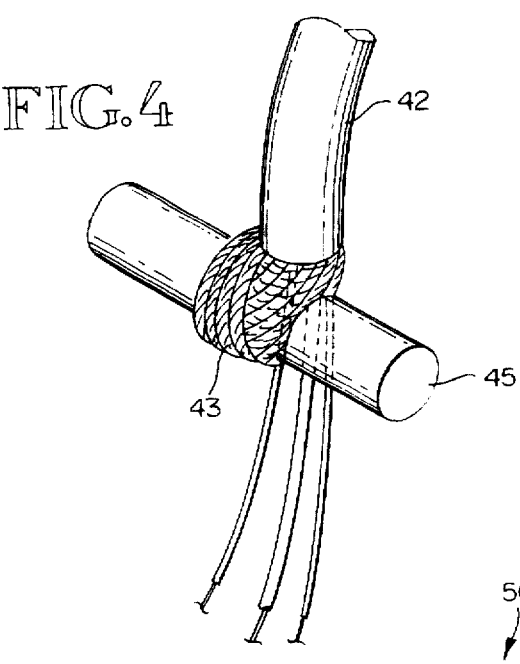
FIG. 4 is an elevational view showing connection of the video/power cable to the camera assembly of the present invention.

FIG. 3 shows the detail of the abutting relationship between glass element 30 and the adjacent surface 26 of the molded portion 11 of housing 10. The adjacent surface 26 of the molded portion includes small peripheral circular ridges 31 which are compressed by glass element 30 when it is in place. This arrangement creates a pressure-loaded seal between the glass element 30 and the molded portion 11, preventing water from entering the housing between the glass element and the molded portion.

When the glass element 30 and the lens cover 32 are in place, a clamp 46 is positioned in the shallow groove 28 around the exterior periphery of the housing and tightened, thereby forcing the molded portion against the peripheral edge 35 of the glass lens element. This provides an additional sealing effect between the peripheral edge of lens element 30 and the molded portion, again helping to prevent water from reaching the interior of the apparatus. Hence, the interior of the housing is well sealed, without the use of special sealing elements.

Figure 5:
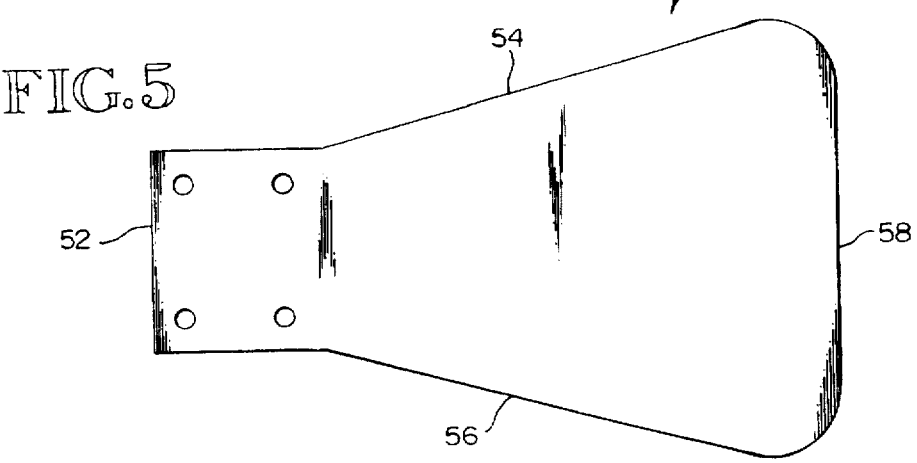
FIG. 5 is an elevational view of the portion of the camera assembly of FIG. 1.
Figure 6:
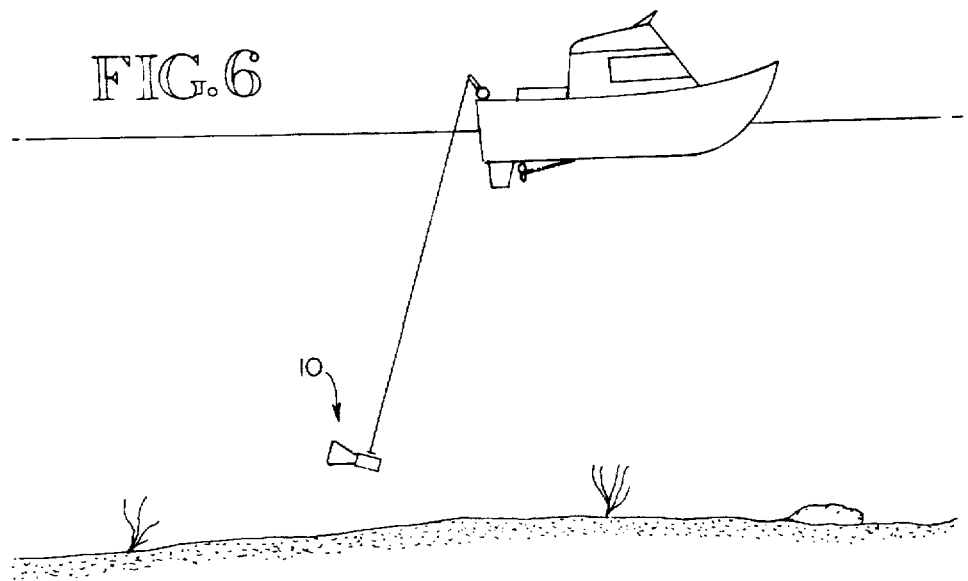
FIG. 6 is an environmental view showing a typical use of the present invention.

FIG. 5 shows a fin element 50 which is attached to the housing at tab portion 12 of molded portion 11. Fasteners such as screws or the like fit through openings 14 in tab portion 12 and mating openings 39 at one end of fin element 50. Fin 50 is hence detachable from the remainder of the housing. It operates to prevent the assembly from wobbling underwater, maintaining the camera position so that it can continuously view a particular object into a drift.

In the embodiment shown, the fin is approximately 3¼ inches wide at one end, with the width gradually increasing from a point approximately 2 inches in from one end 52. The opposing longitudinal edges 54 and 56 of the fin angle slightly outwardly and then curve around toward each other, forming the distal end 58. The point of greatest width is near distal end 58, approximately 5½ inches in the embodiment shown. The total length of the fin 50 is approximately 8½ inches. In the embodiment shown, the fin is made of a clear blue plexiglass. As indicated above, the fin 50 provides stability for the assembly when it is underwater.

Hence, an underwater video camera assembly has been disclosed which provides a number of significant advantages. It is simple and easy to use due to its compact shape, and it is constructed and arranged so as to remain generally horizontal underwater. It uses a clamping system and a molded polyurethane portion of the housing to provide a watertight seal without a plurality of individual fasteners. It can be dropped readily through the water to the desired viewing area because of the weight of the steel cup and is extremely durable in operation.

Although a preferred embodiment of the invention has been disclosed herein for illustration, it should be understood that various changes, modifications and substitutions may be incorporated in such embodiment without departing from the spirit of the invention, as defined by the claims which follow:

What is claimed is:

1. An assembly apparatus for housing an underwater video camara, comprising:

a housing body including a cavity therein adapted for receiving a video camara, the video camara having a lens portion;

a transparent element positioned in the vicinity of a front end of the housing body, in front of the video camara, wherein the housing body includes a recess in an interior surface thereof and wherein the transparent element has a peripheral edge which mates in the recess;

an interior metal liner which extends along a portion of the housing body, terminating prior to the transparent element, the metal liner providing sufficient weight and rigidity for the assembly that the assembly readily sinks in water and does not collapse from water pressure; and means for applying pressure around substantially the entire circumference of the housing body outboard of said recess thereof, wherein the housing body is sufficiently compressible that the circumferential pressure creates a seal along the peripheral edge of the transparent element, preventing water from entering the interior of the housing body.

2. An apparatus of claim 1, including a protective cover for the transparent element, positioned so as to abut a front surface of the transparent element, the protective cover including an opening which is larger than the lens portion of the video camara, the opening further being less than one-half of the diameter of the transparent element.

3. An apparatus of claim 1, wherein the housing body includes an opening through which a video/power cable extends into the cavity for connection to the video camara, wherein the opening is located at a submerged center of gravity for the assembly such that the assembly remains substantially horizontal when submerged.

4. An apparatus of claim 3, wherein the cable includes a support portion, other than video and power wire portions, which is secured to an element located within the housing body, the element being positioned adjacent an interior surface of the housing body, such that said assembly is supported without any tension on the video and power wire portions.

5. An apparatus of claim 1, including foam cushioning means for the video camera in the cavity of the housing body.

6. An apparatus of claim 1, including a fin element which is attachable to a rear end of the housing body, the fin providing directional stability for the assembly.

* * * * *